July 10, 1951
C. E. WORKMAN
2,560,023
METHOD OF MAKING PRECISION RESILIENT BUSHING
Filed March 3, 1948
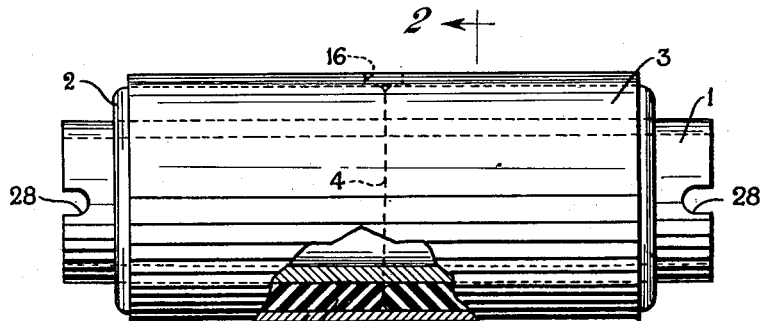
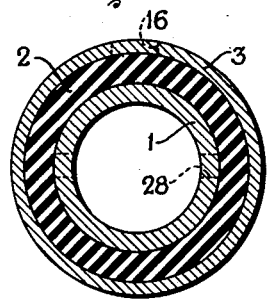
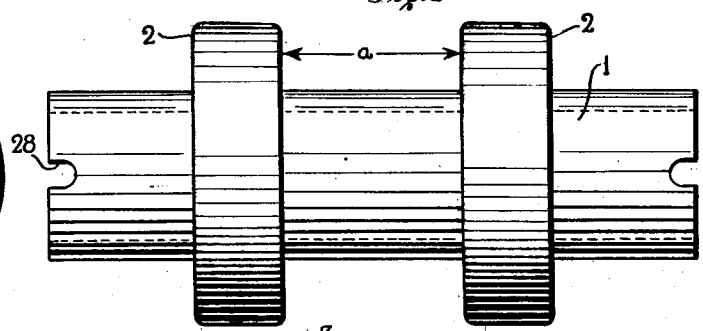
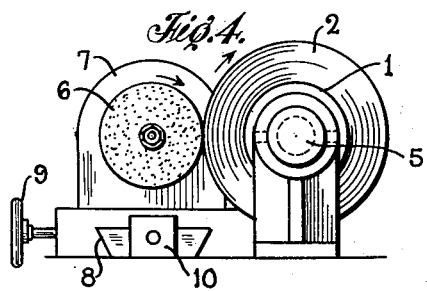
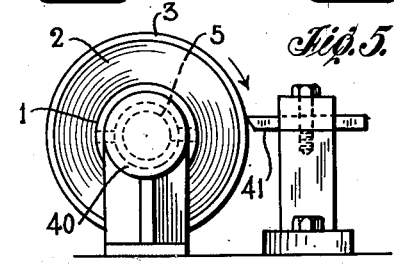
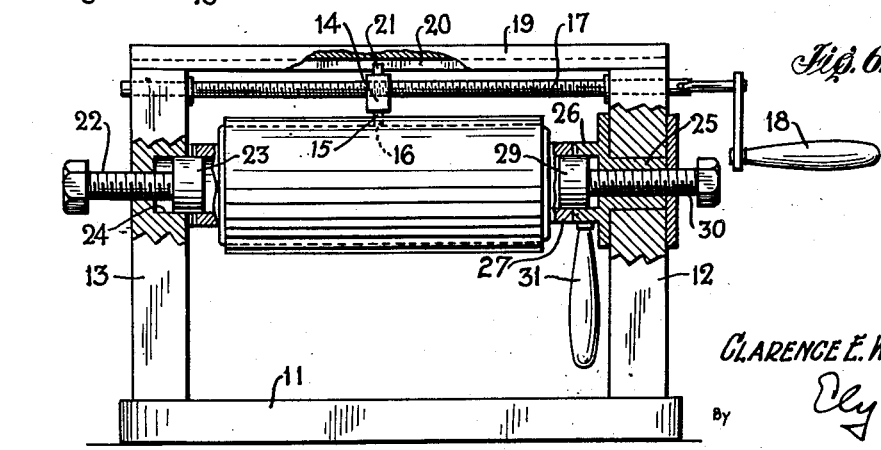
Inventor
CLARENCE E. WORKMAN
By Ely & Frye
Attorneys Patented July 10, 1951

2,560,023

UNITED STATES PATENT OFFICE 2,560,023

METHOD OF MAKING PRECISION RESILIENT BUSHING

Clarence E. Workman, Akron, Ohio, assignor to The Firestone Tire & Rubber Company, Akron, Ohio, a corporation of Ohio Application March 3, 1948, Serial No. 12,836

3 Claims. (Cl. 29—149.5)

This invention relates to a bushing of the type having an inner metal shaft, an outer sleeve and an intermediate resilient cushioning member of rubber or rubber-like material. In such devices the cushioning member is preferably under compression radially of the metal cylinders and serves to transmit torque or other loads while damping vibrations and eliminating noise. Such devices have in the past been employed in assemblies where precise dimensions of the bushing were not a matter of great moment. However, the increasing range of employment of the bushings has spread into the field of precision parts where tolerances of the order of thousandths of an inch are demanded. Obviously, to achieve such results, ordinary methods of fabrication will not suffice in view of the very nature of rubber-like material and the uncertainties incident to its assemblage into a bushing.

In the conventional assembly of such bushings, rubber annuli are molded onto a shaft at spaced positions. The shaft is then inserted into an outer sleeve, the rubber being "funneled in" to a point beyond the final position, and is then driven back to final position, the deformed rubber filling up the spaces originally existing between the annuli. In the prior art bushings, the ends of the rubber could coincide with the ends of the sleeve or terminate somewhat inwardly or outwardly thereof within appreciable limits. However, when the device is to be employed as a precision part, the limits of the resilient element must be precisely controlled.

It is therefore an object of the invention to provide a resilient bushing responding to precision tolerances and the method of making the same, a further object being to provide a method of making such bushings wherein the resilient material is accurately placed, and in a condition of uniform stress.

For a complete understanding of the invention, reference is had to the accompanying specification and the drawings, in which:

Fig. 1 is an elevation of an assembled bushing,

Fig. 2 is a section on the line 2—2 of Fig. 1,

Fig. 3 is an elevation of the inner parts of the bushing prior to insertion in the outer sleeve, Fig. 4 is an end view of the sub-assembly of Fig. 2 in conjunction with a grinding mechanism, Fig. 5 is an end view of the assembled device of Fig. 1 in conjunction with a metal-cutting mechanism, and Fig. 6 is an elevational view of a bushing and oscillating mechanism therefor.

Referring to the drawings by characters of reference, there is shown, in Fig. 3, a hollow shaft 1 having bonded thereto rubber annuli 2 spaced from each other and from the ends of the shaft 1. To attain the completed assembly of Fig. 1, a sleeve 3 is made to envelop the annuli 2, the latter being compressed in the process. The dimensions of the annuli 2 are such that when they are in place between the shaft and sleeve, the spacing $a$ is taken up with deformed rubber (as shown by the dotted line 4 in Fig. 1), representing the excess of diameter of the members 2 over the inner diameter of the sleeve 3. In inserting the rubber annuli into the sleeve the practice is to afford a preliminary compression by extraneous means such as a funnel-like member, the rubber-bonded shaft being inserted somewhat beyond its desired position and then forced back to normal position.

All of the steps in the foregoing paragraph are conventional in the art and are set forth in greater detail in Patent No. 2,049,024, to Robertson, to which reference is made for a more complete description.

In the known methods of constructing resilient bushings, the sub-assemblage shown in Fig. 3 is placed in a heated mold and cured. In this phase the outer dimensions of the shaft 1 may not be truly concentric and the same is true of those portions of the mold which support the member 1 as well as those portions which mold the annuli 2. Furthermore, it may well be that these errors of dimension may occur cumulatively in a given region of the processed article which would throw it entirely out of the tolerances required in precision parts. Again, the sleeve 3 may lack concentricity in either or both of its surfaces, and even in the case where all the separate components are of acceptable dimensions, the process of mounting the outer sleeve may result in a lack of concentricity in the outer surface.

All of the foregoing difficulties are overcome by the method of this invention which comprises, in its most specific form, the operations illustrated in Figures 4 to 6. The annuli being molded onto the shaft as in Fig. 3, the work is mounted between accurate centers, one of which such as a tailstock center is shown at 5 in Fig. 4, the annuli 2 being in engageable relation with some form of grinder such as 6 operated as by a motor 7 or other device all mounted on a precision feed device 8 shown as having a hand-wheel 9. The annuli 2 being rotated in one direction, and the grinder in the opposite direction, the latter is fed in until it is found to make contact with the entire periphery of the rubber. This condition may be gauged in various ways, as by "feel" in the handwheel, by the sound of work engagement or by visual means. Calipering may be employed, but is not strictly necessary since the actual radial extent of the annuli, within relatively broad limits, is not of the essence in the precision results sought. A feeding device for movement longitudinally of the work piece is shown generally at 10.

Having trued the periphery of the rubber, the next step is to insert the shaft and rubber rings into the outer ring. In the first stages this is accomplished by the means alluded to above and described in the afore-mentioned patent. It has been found, however, that for the attainment of precise dimensions further operations are required. Generally these comprise a series of oscillations of the outer sleeve relative to the inner part in a direction axially thereof, which results in the rubber component finding its true position symmetrical with the organization and being in a state of uniformly distributed stress. The attainment of equilibrium is also favored by a rotational oscillation of the outer sleeve about the axis of the bushing. The organization shown in Fig. 6 serves to illustrate these steps. A base member 11 with uprights 12, 13, serves to mount the bushing by engaging the ends of the inner tube 1. Translation of the sleeve 3 is occasioned by a rider 14 having a pin 15 engaging in the hole 16. The rider 14 is threadedly engaged with a shaft 17 and is caused to move axially of the shaft upon turning of the crank handle 18. A top brace 19 has a groove 20 receiving a projection 21 on the rider 14 to eliminate rotational movement of the sleeve in this phase of operations.

The holding and rotating means will now be described. A screw 22 threaded in the upright 13 carries a pin 23 slidable in a counterbore 24 and insertable into the tube 1 to form a support therefor. In the upright 12, a flanged bushing 25 has a sleeve 26 adapted to abut the right hand end of tube 1, and having tetes 27 adapted to mate with the semicircular slots 28 in the tube. Support for the tube is afforded by a pin 29 carried by a screw 30 threadedly engaging the inner portion of the bushing 25. A handle 31 carried by the bushing sleeve 26 affords a means to rotate the tube 1, the sleeve 3 being held against rotation by the pin 15. The translation and rotation may be performed separately or concurrently. While the handle 31 is shown depending from sleeve 26, it will be appreciated that this is for clarity of illustration, and the handle will, more conveniently, protrude from the sleeve in a horizontal, mean position.

Finally the entire assemblage is centered in a metal-working machine such as a lathe or grinder and the outer periphery trued. In Fig. 5 the work is shown centered on a tailstock 40 and a tool 41 is shown engaging the work. The actual cutting operation per se, being conventional, need not be described in any greater detail. It will be understood, of course, that a grinder or other means may be employed for truing the periphery.

While an assemblage in the manner of the prior art with the single additional step of truing the outer periphery of the sleeve 3 is possible, it does not result in the complete advantages accruing where all of the steps herein described are employed. For instance, if the outer sleeve be the only accurately concentric surface, it may happen that the outer sleeve, in service, may move axially or circumferentially of the rubber component, in which case the concentricity of the outer surface would no longer obtain.

It is to be noted that whereas centering and truing are well known in the various arts, it has always been sufficient, in an integrated assemblage, that the final surface be the only one that merits attention. In the art to which this invention pertains, which is relatively new in itself, the manner of achieving a final, accurate article involves preliminary and intermediate treatment. Two resilient rings have been illustrated as associated with the bushing, but it will be understood that more or less than two may be employed.

While a particular form of the invention has been shown, various modifications thereof are possible and I therefore do not wish to be limited except within the spirit and scope of the appended claims.

What is claimed is:

1. The method of constructing a resilient bushing of the type comprising an outer, tubular metal sleeve and an inner, rubber-like component carried by a shaft and under compressive stress between the sleeve and shaft which comprises molding the said component into bonded relation with the shaft, centering the shaft, grinding the rubber-like component into concentricity with the shaft, compressing the rubber-like component and inserting it while so compressed into the sleeve in approximately final position, reciprocating the sleeve relatively to the shaft, again centering the shaft, and reducing the sleeve to concentricity with the shaft.

2. The method of making a bushing of the class described comprising the steps of molding rubber portions on a rigid shaft in longitudinal spaced relation intermediate the ends thereof, machining said rubber portions to true cylindrical forms concentric with said shaft, inserting said shaft and rubber portions into a cylindrical outer case whose inside diameter is less than the outside diameter of said rubber portions, subjecting said outer sleeve to a series of oscillations in an axial direction relative to said shaft, and machining the outer surface of said case to true cylindrical form concentric with said shaft.

3. The method of making a bushing of the class described comprising the steps of molding rubber portions on a rigid shaft, machining said rubber portions to true cylindrical forms concentric with said shaft, inserting said shaft and rubber portions into a cylindrical outer case whose inside diameter is less than the outside diameter of said rubber portions, subjecting said outer sleeve to a series of oscillations in an axial direction relative to said shaft, and machining the outer surface of said case to true cylindrical form concentric with said shaft.

CLARENCE E. WORKMAN.

REFERENCES CITED

The following references are of record in the file of this patent:

UNITED STATES PATENTS

| Number | Name | Date |
|---|---|---|
| 1,159,645 | Brown | Nov. 9, 1915 |
| 1,830,814 | Thiry | Nov. 10, 1931 |
| 1,895,093 | Carlson | Jan. 24, 1933 |
| 1,900,938 | Kerruish | Mar. 14, 1933 |
| 1,949,527 | Briney | Mar. 6, 1934 |
| 1,984,718 | Wistrand | Dec. 18, 1934 |
| 2,049,024 | Robertson | July 28, 1936 |
| 2,201,932 | Tibbetts | May 21, 1940 |
| 2,244,197 | Hessler | June 3, 1941 |
| 2,446,621 | Thiry | Aug. 10, 1948 |